US005659633A

United States Patent [19]

Ilan et al.

[11] Patent Number: 5,659,633
[45] Date of Patent: Aug. 19, 1997

[54] CHARACTER RECOGNITION METHOD UTILIZING COMPASS DIRECTIONS AND TORSION POINTS AS FEATURES

[75] Inventors: Gabriel Ilan, Tel Aviv; Shmuel Isaak, Holon, both of Israel

[73] Assignee: Advanced Recognition Technologies, Inc., Israel

[21] Appl. No.: 233,086

[22] Filed: Apr. 25, 1994

Related U.S. Application Data

[63] Continuation of Ser. No. 978,578, Nov. 19, 1992, abandoned.

[30] Foreign Application Priority Data

Nov. 29, 1991 [IL] Israel .......................................... 100198

[51] Int. Cl.$^6$ ........................................................ G06K 9/48
[52] U.S. Cl. .................................................. 382/186; 382/198
[58] Field of Search .................................. 382/186, 187, 382/185, 242, 197, 119, 123, 198, 241

[56] References Cited

U.S. PATENT DOCUMENTS

| | | | |
|---|---|---|---|
| 3,930,229 | 12/1975 | Crane et al. | 382/37 |
| 4,284,975 | 8/1981 | Odaka | 382/45 |
| 4,561,105 | 12/1985 | Crane et al. | 382/30 |
| 4,653,107 | 3/1987 | Shojima et al. | 382/13 |
| 4,718,102 | 1/1988 | Crane et al. | 382/13 |
| 4,878,249 | 10/1989 | Mifune et al. | 382/13 |
| 4,905,295 | 2/1990 | Sato | 382/197 |
| 5,038,382 | 8/1991 | Lipscomb | 382/13 |
| 5,077,802 | 12/1991 | Plamondon | 382/3 |
| 5,105,468 | 4/1992 | Guyon et al. | 382/187 |

OTHER PUBLICATIONS

Lev et al. "Recognition of Handwritten Hebrew One–Stroke Letters by Learning Syntactic Representations of Symbols." IEEE Trans. Systems, Man and Cybernetics, vol. 19, No. 5, pp. 1306–1313, Sep. 1989.

Al–Emami, et al. "On–line Recognition of Handwritten Arabic Characters", IEEE Trans. on Pat. Analysis and Machine Intelligence, vol. 12, Iss. 7, pp. 704–710, Jul. 1990.

Berthod et al., "Morphological Features and Sequential Information in Real Time Handprinting Recognition," *IEEE Proc. of the 2nd Int. Joint Conference on Pattern Recognition*, 13 Aug. 1974, Copenhagen, DA, pp. 358–363.

(List continued on next page.)

*Primary Examiner*—Leo Boudreau
*Assistant Examiner*—Jon Chang
*Attorney, Agent, or Firm*—Skjerven, Morrill, MacPherson, Franklin & Friel

[57] ABSTRACT

A method of recognizing a character is described which includes the following operations: (a) measuring the angle of the tangent to the character at each of a plurality of sample points on the character, (b) assigning those points having a tangent direction within a first, small predefined angle from the vertical axis with values of Up or Down compass directions, and those points having a tangent direction within the first, small predefined angle from the horizontal axis with values of Left of Right compass directions and (c) selecting special points. The special points are those sample points: i) at the beginning and end of the character; ii) whose compass direction is different than that of the previously selected special point; iii) whose compass direction is the same as the previously selected special point only if: a) there is at least one sample point, among the sample points between the two sample points with the same compass direction, which has no compass direction and b) at least one of the sample points with no compass direction is a "torsion" point defined as a point having a tangent direction which is a significant local extremum among those sample points with no compass direction between the two sample points having the same compass direction; and iv) which are torsion points.

13 Claims, 13 Drawing Sheets

OTHER PUBLICATIONS

Aizawa, "Signal Processing Approach to Optimum Preprocessing for On–line Recognition of Handwritten Japanese Characters," *Systems and Computers in Japan*, vol. 19, No. 2, Feb. 1988, New York, US, pp. 51–63.

Berthod et al., "Learning in Syntactic Recognition of Symbols Drawn on a Graphic Tablet," *Computer Graphics and Image Processing*, vol. 9, No. 2, Feb. 1979, New York, US, pp. 166–182.

Tappert et al., "The State of the Art in On–line Handwriting Recognition," *IEEE Trans. on Pattern Analysis and Machine Intelligence*, vol. 12, No. 8, Aug. 1990, pp. 787–808.

SPECIAL POINTS SEQUENCE

1 : "A"

1-STROKE

|     | X  | Y  | PTD   | ATTR |
|-----|----|----|-------|------|
| P1  | 0  | 0  | U     |      |
| P2  | 6  | 15 | R     | B    |
| P3  | 7  | 15 | D     |      |
| P4  | 8  | 1  | R     | B    |
| P5  | 9  | 1  | U     |      |
| P6  | 5  | 10 | L     |      |
| P7  | 0  | 8  | D     |      |
| P8  | 2  | 6  | R     |      |
| P9  | 12 | 7  | U     | D    |
| P10 | 15 | 7  | <END> |      |

SPECIAL POINTS SEQUENCE

2 : "B"

1-STROKE

|  | X | Y | PTD | ATTR |
|---|---|---|---|---|
| P1 | 0 | 9 | U | D |
| P2 | 6 | 15 | R | B |
| P3 | 7 | 15 | D |  |
| P4 | 4 | 0 | L |  |
| P5 | 2 | 0 | U |  |
| P6 | 11 | 15 | R |  |
| P7 | 12 | 15 | D |  |
| P8 | 9 | 9 | L |  |
| P9 | 8 | 9 | U | B |
| P10 | 8 | 9 | R |  |
| P11 | 15 | 7 | D |  |
| P12 | 10 | 3 | L |  |
| P13 | 6 | 3 | U |  |
| P14 | 5 | 4 | <END> |  |

SPECIAL POINTS SEQUENCE

3 : "t"

2-STROKE

|     | X  | Y  | PTD     | ATTR |
|-----|----|----|---------|------|
| P1  | 0  | 0  | R       | D    |
| P2  | 12 | 14 | U       | B    |
| P3  | 12 | 14 | L       |      |
| P4  | 6  | 15 | D       |      |
| P5  | 11 | 2  | R       |      |
| P6  | 13 | 3  | <END1>  |      |
| P9  | 2  | 8  | R       |      |
| P10 | 15 | 8  | <END2>  |      |

SPECIAL POINTS SEQUENCE

4 : "E"

| | X | Y | PTD | ATTR |
|---|---|---|---|---|
| P1 | 0 | 7 | R | D |
| P2 | 11 | 14 | U | |
| P3 | 11 | 15 | L | |
| P4 | 7 | 15 | D | |
| P5 | 5 | 6 | R | |
| P6 | 13 | 8 | U | |
| P7 | 12 | 8 | L | |
| P8 | 4 | 3 | D | |
| P9 | 7 | 0 | R | |
| P10 | 11 | 0 | U | |
| P11 | 15 | 2 | <END> | |

SPECIAL POINTS SEQUENCE

5 : "E"

1-STROKE

| | X | Y | PTD | ATTR |
|---|---|---|---|---|
| P1 | 0 | 8 | R | D |
| P2 | 11 | 14 | U | |
| P3 | 10 | 15 | L | |
| P4 | 6 | 14 | D | |
| P5 | 6 | 6 | R | |
| P6 | 10 | 7 | U | B |
| P7 | 9 | 7 | L | |
| P8 | 8 | 6 | D | |
| P9 | 6 | 0 | R | |
| P10 | 12 | 1 | U | |
| P10 | 15 | 5 | <END> | |

SPECIAL POINTS SEQUENCE

6 : "i"

2-STROKE

|    | X  | Y  | PTD     | ATTR |
|----|----|----|---------|------|
| P1 | 0  | 0  | R       | D    |
| P2 | 12 | 11 | U       | B    |
| P3 | 12 | 11 | L       |      |
| P4 | 6  | 13 | D       |      |
| P5 | 11 | 2  | R       |      |
| P6 | 13 | 3  | <END1>  |      |
| P8 | 11 | 13 | <NULL>  |      |
| P9 | 11 | 13 | <END2>  |      |

CHARACTER RECOGNITION METHOD UTILIZING COMPASS DIRECTIONS AND TORSION POINTS AS FEATURES

This application is a continuation of application Ser. No. 07/978,578, filed Nov. 19, 1992 now abandoned.

FIELD AND BACKGROUND OF THE INVENTION

The present invention relates to a method of recognizing characters. The term "character" is used herein in its broadest meaning, to include not only conventional alpha-numeric characters, but also various symbols, such as mathematical, scientific, phonetic, shorthand, etc., symbols. The method of the present invention is particularly useful for recognizing handwritten characters in real-time, and is therefore described below with respect to this application.

Many character recognition methods have been described in the literature for recognizing both pre-printed characters off-line and handwritten characters on-line. A good review of the previously proposed methods is described in the article "The State of the Art in On-Line Handwriting Recognition" by C. C. Tappert, C. Y. Suen, and T. Wakahara, IEEE Transactions on Pattern Analysis and Machine Intelligence, Vol. 12, No.8, August 1990, Pages 787–808. This article lists 286 prior publications as references.

OBJECTS AND BRIEF SUMMARY OF THE INVENTION

Main Object of the Invention

The main object of the present invention is to provide a new method of character recognition which has a number of important advantages making it particularly useful for on-line recognition of handwritten characters, although various aspects of the method could also advantageously be used for off-line recognition of pre-printed characters.

Main Features of the Invention

According to a broad aspect of the present invention, there is provided a method of recognizing a character comprising the operations:

(a) measuring the angle of the tangent to the character at each of a plurality of sample points on the character;

(b) assigning those points having a tangent direction within a first, small predefined angle from the vertical axis with values of Up (U) or Down (D) compass directions, and those points having a tangent direction within the first, small predefined angle from the horizontal axis with values of Left (L) or Right (R) compass directions;

(c) selecting as special points at least those sample points:

i) at the beginning and end of the character;

ii) whose compass direction is different than that of the previously selected special point;

iii) whose compass direction is the same as the previous special point only if:

a) there is at least one sample point, among the sample points between the two sample points with the same compass direction, which has no compass direction, and b) at least one of the sample points with no compass direction is a "torsion" point defined as a point having a tangent direction which is a significant local extremum among those sample points with no compass direction between the two sample points having the same compass direction;

iv) which are torsion points;

(d) arranging the special points according to predefined rules; and (e) utilizing the resulting arrangement of special points for recognizing the character.

In the preferred embodiment of the invention described below, the first predefined angle in operation (b) is no more than 15° from the respective axis; preferably, it is 11°.

As indicated earlier, the method is particularly useful for the real-time recognition of handwritten characters as they are written as a series of handwritten strokes, in which case the arrangement of special points resulting from operation (d) above is a time-ordered sequence.

According to further features in the preferred embodiment of the invention described below, the method also includes determining the location of the start and end points of each handwritten stroke, and utilizing also the locations of those end points as special points for recognizing the character. The preferred embodiment of the invention also utilizes "torsion" points and "breaking points" (both as defined below) as special points for recognizing the character. In addition, certain attributes, called "breaking", and "diagonal" (both as defined below) are assigned to some of the special points and are also used for identifying the character.

According to still further features in the described preferred embodiment, the time-ordered sequence of special points is utilized for recognizing the character by matching them with stored sequences of special points of a plurality of stored reference characters. More particularly, the stored sequences of special points are stored in a library which also includes the number of strokes of each stored reference character. A preliminary screening operation is performed wherein the number of strokes of the handwritten character to be recognized is compared with the number of strokes of the stored reference characters in the library, and eliminates from further matching those reference characters not having the same number of strokes as in the handwritten character to be recognized.

According to still further features in the described preferred embodiment, if more than one reference character of the library matches the sequence of special points of the handwritten character to be recognized, a decision operation is performed (after normalizing the coordinates of all the special points of the handwritten character to the smallest rectangle which encompasses all the special points), to determine the reference character having the best match with the handwritten character, by: (i) calculating the sum of the square distances between corresponding special points of the handwritten character to be recognized, and each of the matched reference characters; and (ii) identifying the handwritten character as the reference character having the smallest sum so calculated.

The method of the described preferred embodiment is based on three basic stages:

1. a rough screening stage, in which the number of strokes of the inputted character to be recognized is compared with those of each stored reference character, and the reference characters having a different number of strokes are eliminated;

2. a fine screening stage, in which the above-described special point sequence extracted from the inputted handwritten character is compared with those of the remaining candidates of the stored reference characters to eliminate most of the remaining candidates; and 3. a decision stage, in which the few reference character candidates remaining (if there is more than one after the fine screening stage) are compared with the inputted handwritten character, and a decision is made as to which reference character is the "best" match.

The foregoing features of the novel recognition method describe its normal working, or "Recognition" mode. The Recognition mode, however, may be preceded by a "Learning" mode, for "learning" the specific characters of the user. Thus, during the Learning mode, the various characters or other symbols to be recognized may be handwritten by the user on a digitizing tablet, and then each such character may be identified by a recognition code (e.g., the ASCII code). The features of each such handwritten character, together with its identification, are stored in the library, and are then used during the Recognition mode for identifying the characters as each is handwritten on the digitizing tablet by the user.

Thus, during the Recognition mode, in case of an on-line recognition error (e.g., an error in the identification of a handwritten character, or an inability to recognize an input as one of the reference characters), the user can correct the error immediately by switching to the Learning mode and inputting the correct identification code of the unrecognized input. The character is thus "learned" to enable recognition thereafter.

Main Advantages of the Invention

The character recognition method of the present invention has a number of important advantages, as set forth below, which make it particularly (but not exclusively) useful for the on-line recognition of handwritten characters:

1. The method is adapted to any language: It can be used for recognizing alphabetical characters of any alphabetic language, such as Hebrew, English, Arabic, etc., and also for recognizing special symbols, e.g., mathematical and scientific symbols, phonetic and shorthand symbols, etc.

2. The method is adapated to the user: It may be applied to "learn" the user's idiosyncrasies of writing, and "remembers" the specific features which distinguish one character from the other, while ignoring irregular differences such as distortions and changes in scale. The method may therefore also be used for recognizing and validating signatures, particularly those constituted of one or more relatively short strokes.

3. The method can be realised in real-time even on very small microprocessors: The method utilizes only a small part of the character information to recognize the character such that the method can be run on conventional microprocessors and personal computers at a recognition speed higher than the normal handwriting speed to provide real-time recognition without lag.

4. The method is independent of the hardware and can be run on a wide variety of digital computers: For example, the input information may be from any type of digitizing tablet (e.g., electromagnetic, pressure-sensitive, acoustic); also, the method can be implemented in hardware, software, special silicon chips, or any combination of the above.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Overall System and Modes of Operation

Figure 1:
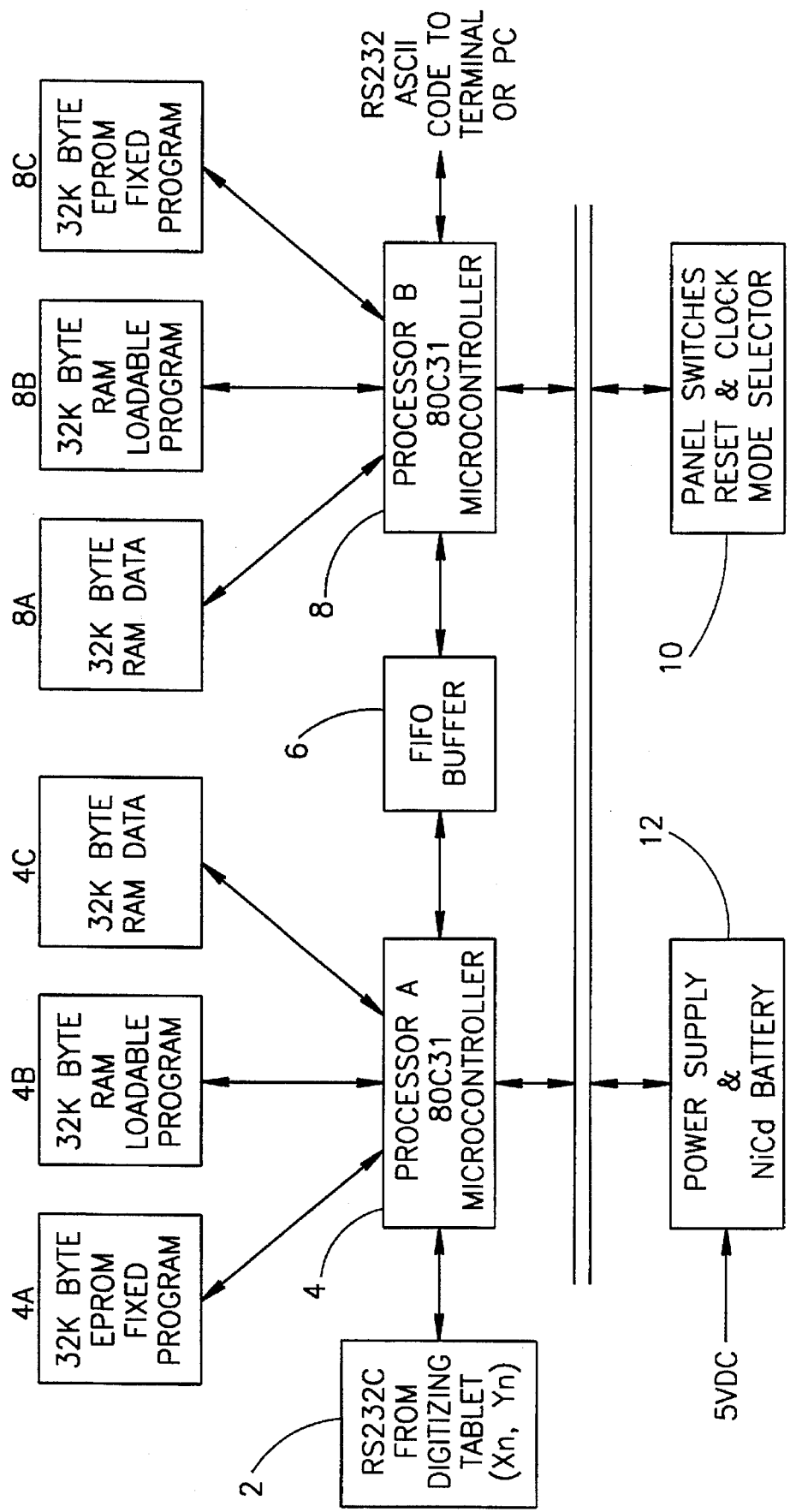
FIG. 1 is a block diagram illustrating one form of character recognition apparatus constructed in accordance with the present invention.
Figure 2:
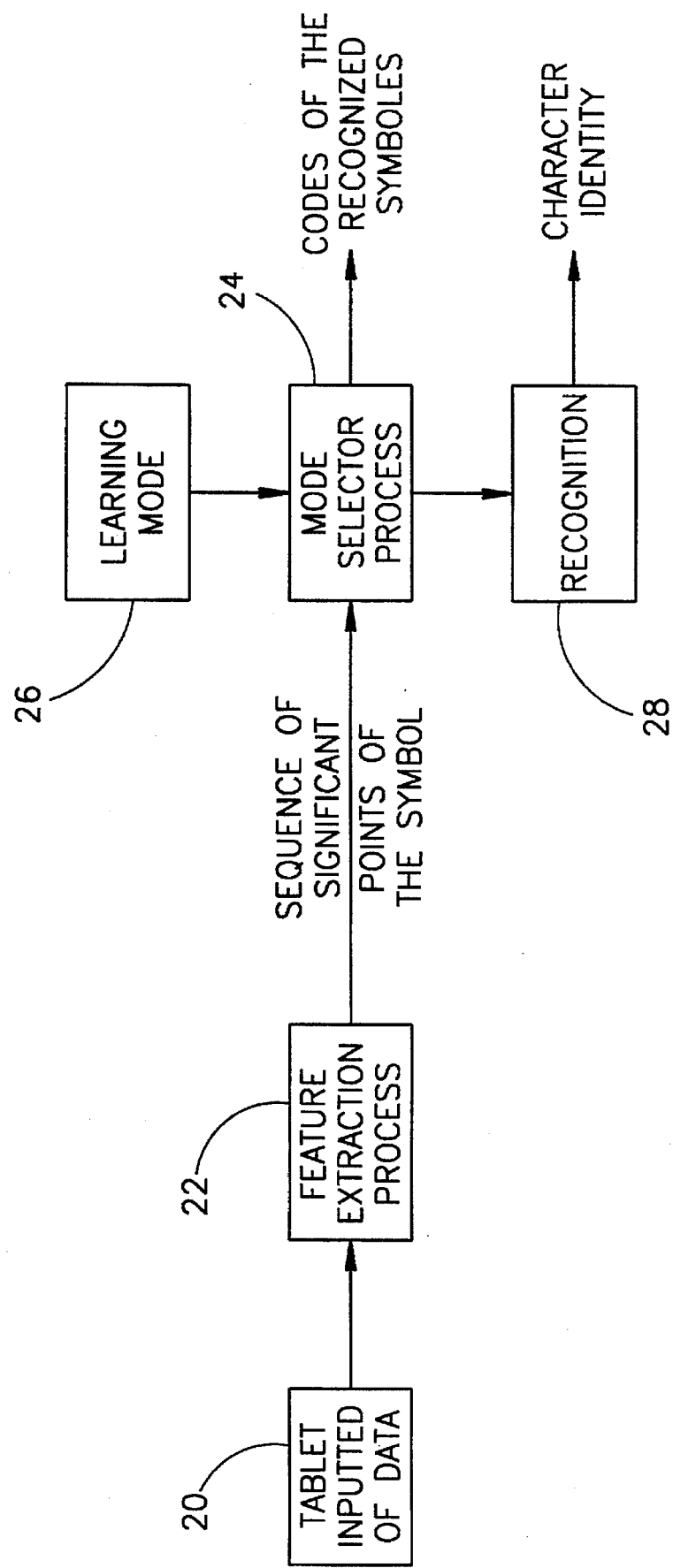
FIG. 2 is a block diagram of the main processes performed by the character recognition method of the present invention.

FIG. 1 is a block diagram illustrating one form of apparatus for recognizing handwritten characters in accordance with the method of the present invention; and FIG. 2 is a block diagram illustrating the main processes involved in the character recognition method.

The apparatus illustrated in FIG. 1 is adapted to be included in an existing processor system having a digitizing tablet 2, or other input device, for inputting the handwritten characters to be recognized. The apparatus includes a main processor 4 which receives the inputted information from the digitizing tablet 2, performs the character recognition method as will be described more particularly below, and outputs a code or other identification identifying the inputted character. The identification outputted by the main processor 4 is fed, via a FIFO (first in first out) buffer 6, to an auxiliary processor 8 which outputs the identification code to an output terminal, a personal computer, or the like, to thereby free the main processor 4 for performing the recognition method.

The main processor 4 includes an EPROM (erasable programmable read only memory) 4a for the fixed program controlling the processor 4, a RAM (random access memory) 4b for a loadable program, and another RAM 4c for storing the data. The auxiliary processor 8 also includes an EPROM 8a for the fixed program, an RAM 8b for the loadable program, and an RAM 8c for the data.

The apparatus illustrated in FIG. 1 also includes conventional panel switches (one of which may be used as a mode selector), reset and clock circuits, etc., all generally designated by block 10, and a power supply and backup battery as generally designated by block 12.

The main processes performed by the main processor 4 are indicated in the block diagram of FIG. 2. Thus, the tablet inputted data 20 is subjected to a feature extraction process 22, which process extracts certain selected features of the inputted data sufficient to identify the handwritten character. A mode selector process 24 determines whether the extracted features should be subjected to a Learning process or a Recognition process. If a Learning process (block 26) is selected, the extracted features are stored in a library of reference characters to be used in the Recognition process; and if the Recognition process (block 28) is selected, the extracted features are compared with the features of the stored reference characters, and a decision is outputted identifying the inputted handwritten character.

The library in which the stored reference characters are stored is in the form of a look-up table identifying the number of strokes of each character and the characteristic features of each stroke. A stroke is determined from the pen-down to the pen-up position of a stylus when writing on the digitizing tablet (2, FIG. 1). For example, some characters are constituted of a single stroke, whereas other characters may be constituted of two, three, four, or more strokes. A "dot" is also considered a stroke, as will be described more particularly below.

The characteristic features of each stroke to identify a reference character are described more particularly below in connection with the operation of the Recognition mode.

When the system is operating according to the Recognition mode, and an on-line recognition error is experienced (e.g., an identification of the wrong character, or inability to identify a character), the user can correct the error immediately by switching back to the Learning mode, so that the features extracted in the feature extraction process 22 are stored as a new reference character along with the identification (e.g., per the ASCII codes). The system may then be switched back to the Recognition mode, whereupon there is a greater probability that the "learned" character will thereafter be correctly recognized.

RECOGNITION MODE

The Three Stages

Figure 3A:
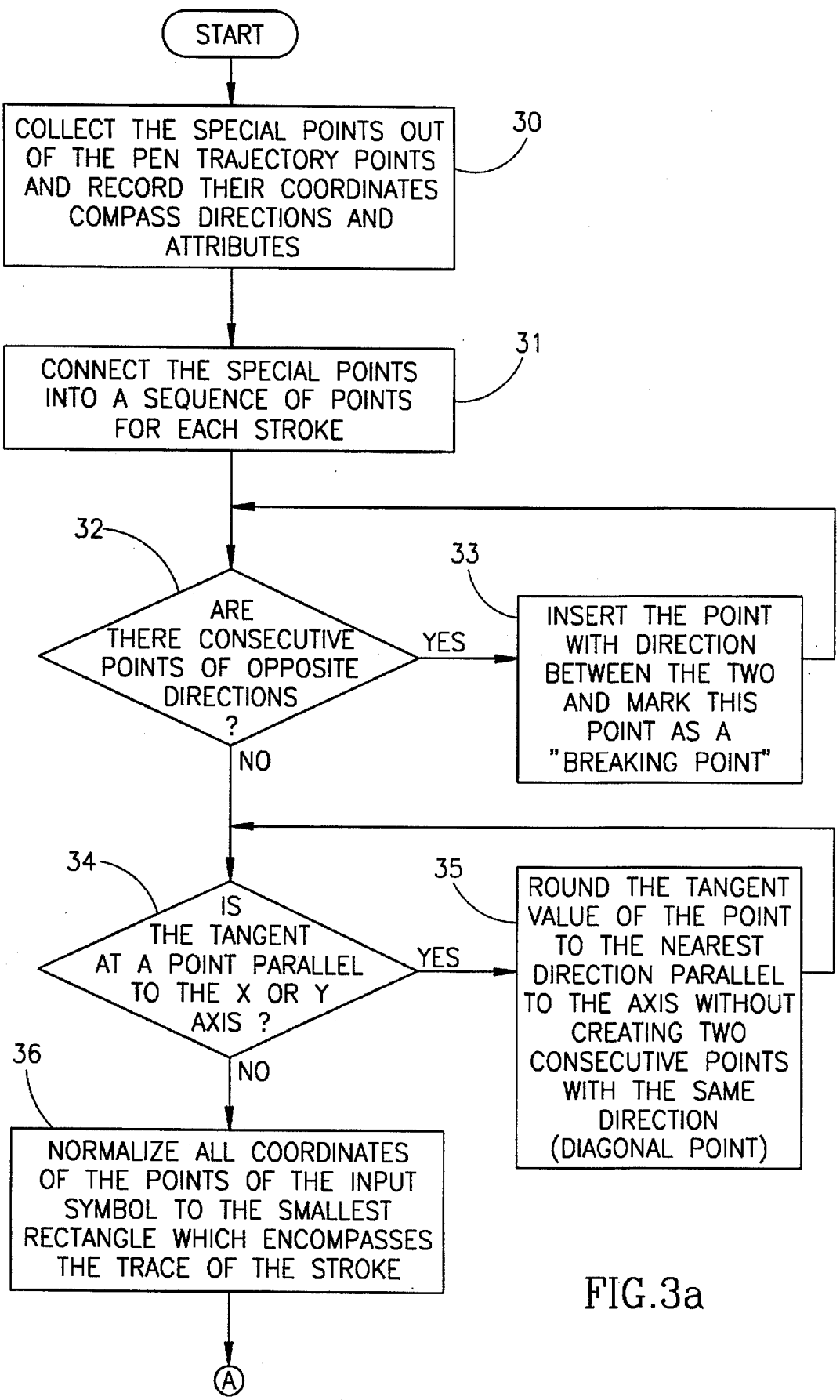
FIGS. 3a–3c, taken together, illustrate the character recognition method described below as a preferred embodiment of the present invention.
Figure 3B:
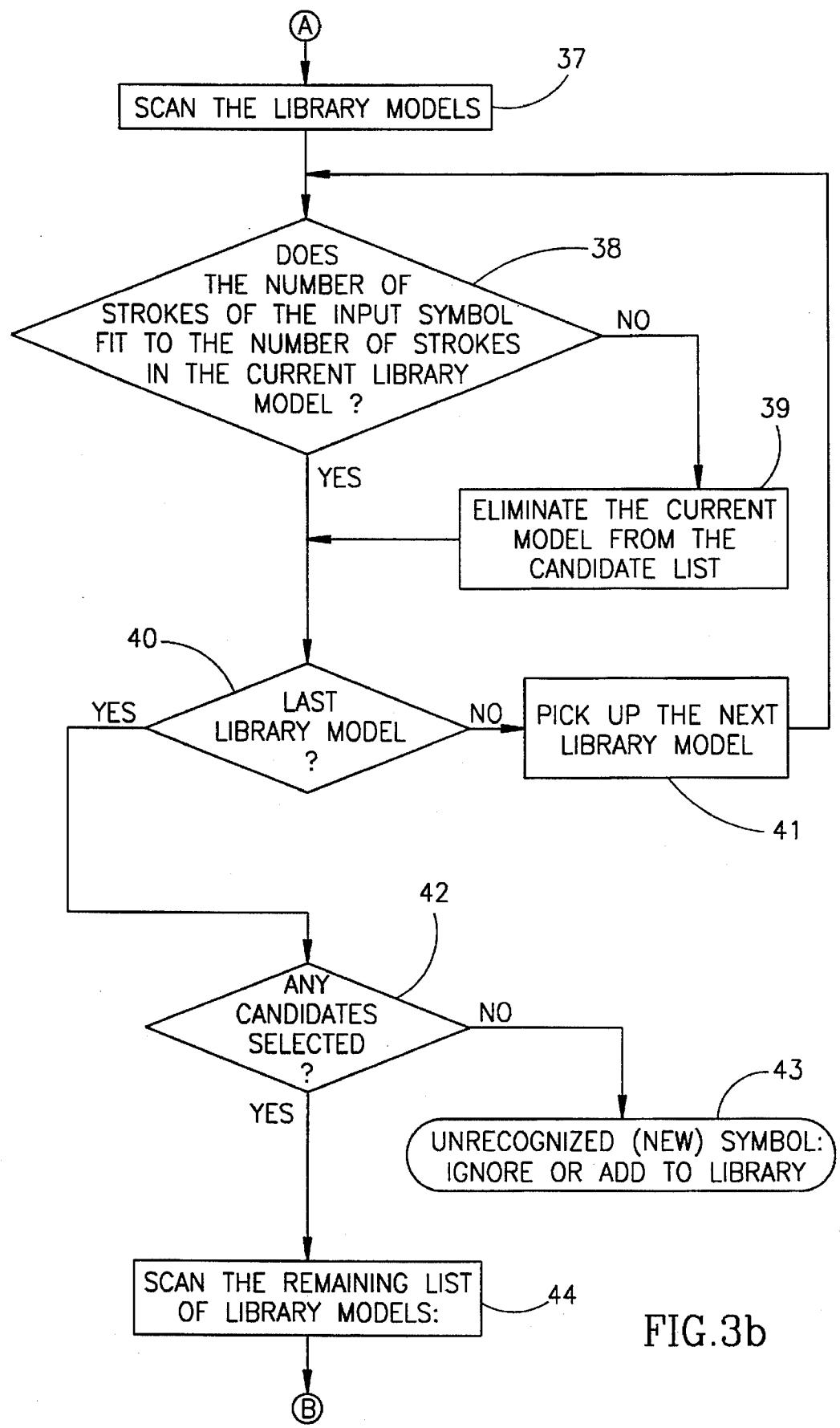
Figure 3C:
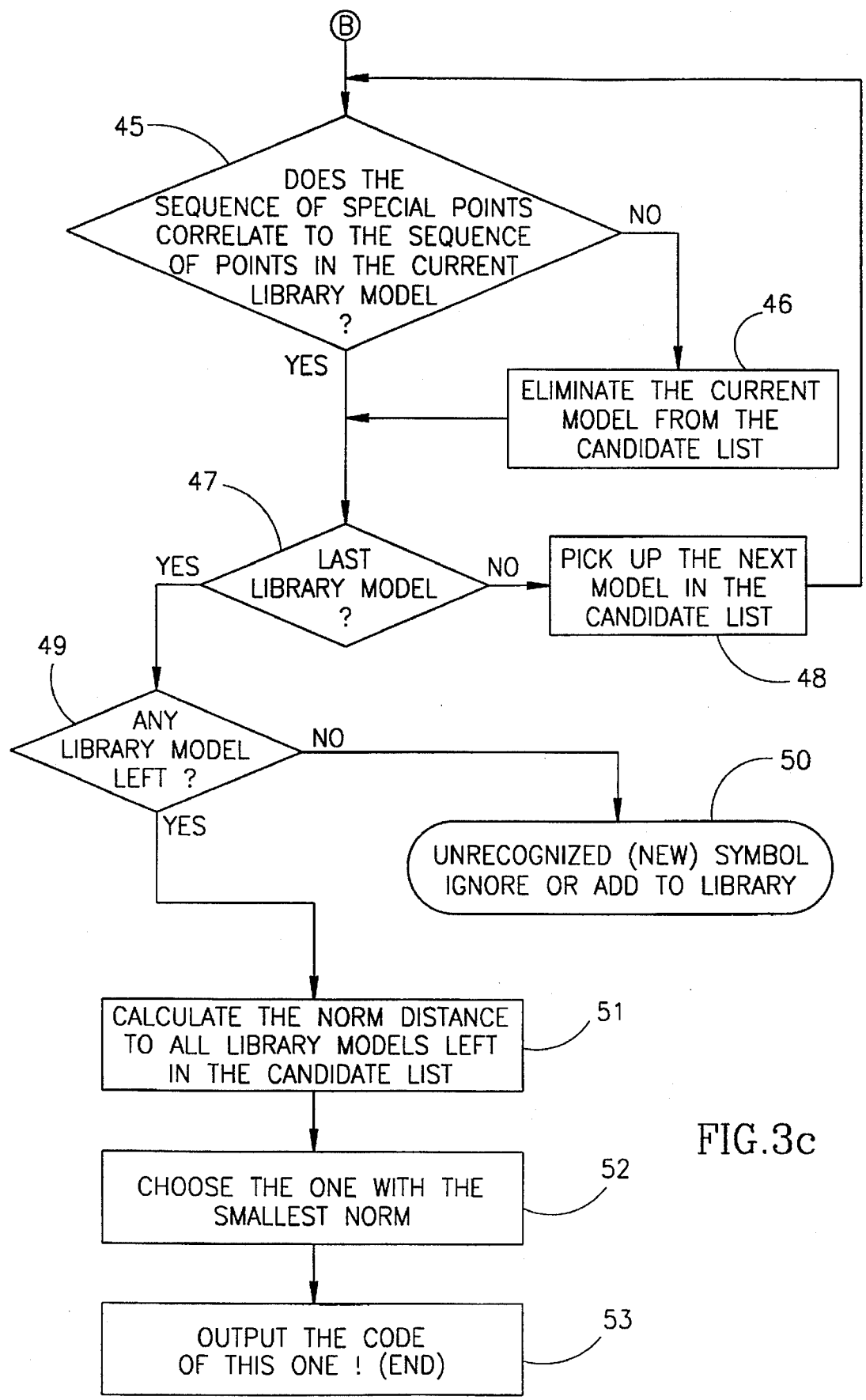

The overall Recognition mode is schematically indicated by the flow chart of FIGS. 3a and 3b. It is constituted of three stages: (1) a coarse screening stage; (2) a fine screening stage; and (3) a decision stage.

The coarse screening stage merely compares the number of strokes of the handwritten character, as inputted via the digitizing tablet 2, with all the reference characters, and those reference characters which have a different number of strokes than the number of strokes of the inputted character are eliminated. This stage substantially reduces the number of reference characters which must be thereafter compared to the inputted character.

In the fine screening stage, the inputted handwritten character is processed according to the flow chart illustrated in FIGS. 3a and 3b to extract certain features of the inputted handwritten character. These extracted features are then compared with the features of all the stored reference characters which were not eliminated in the coarse screening stage, to further reduce in number of stored reference characters to be considered in the final decision stage.

More particularly, the fine screening stage involves:

(a) measuring the angle of the tangent to the character at each of a plurality of sample points on the character;

(b) assigning those points having a tangent direction within a first, small predefined angle from the vertical axis with values of Up (U) or Down (D) compass directions, and those points having a tangent direction within the first, small predefined angle from the horizontal axis with values of Left (L) or Right (R) compass directions;

(c) determining special points;

(d) arranging the special points according to predefined rules; and (e) utilizing the resulting arrangement of special points for recognizing the character.

In the preferred embodiment of the invention described below, the first predefined angle in operation (b) is no more than 15° from the respective axis; preferably, it is 11°.

The tangent direction angle of the character trajectory of each of the plurality of sample points is defined by the angle between an imaginary chord, connecting a preceding sample point with a succeeding sample point both spaced a predefined number of sample points away on either side of the respective sample point, and the vertical axis of the handwriting device. The length of the chord is also measured, and if it is below a predetermined minimum length, the sample point is assigned an identification indicating an undefined tangent direction.

In the preferred embodiment described below, wherein the method is used for the real-time recognition of handwritten characters as they are written as a series of handwritten strokes, the predefined arrangement of special points resulting from operation (d) above is a time-ordered sequence.

Types of Special Points and their Attributes

There are four types of "special points", as follows:

(a) end points (i.e., the "pen-down" start point and the "pen-up" end point) of the trajectories of all pen strokes which belong to the inputted handwritten character;

(b) points in which the tangent to the trajectory is within a first predefined angle from the horizontal axis (X-axis) or the vertical axis (Y-axis);

(c) "torsion" points at which the concavity of the curve changes. Such torsion points occur between two successive special points having the same compass direction. In other words, if two successive special points have the same compass direction and they are not neighbors, there is a curve between them which moves from the original compass direction, through other, curving directions, back to the original compass direction. In order for a curve to return to its compass direction, it must change concavity. Therefore, we define the torsion points to be those points whose tangent direction is a local extremum (smallest or largest) of the tangent directions of the points without compass directions which are between the two special points having the same compass direction. To ensure that insignificant wiggles in the curve are ignored, torsion points are declared only if the tangent direction at the proposed torsion point is a significant local extremum defined as being greater than a second predefined angle from the axis corresponding to the compass direction (U, D, L or R) of the surrounding special points;

(d) breaking points, in which the tangent direction is undefined, but the tangents of the two adjacent special points have opposite directions.

Points (b) and (c) are considered "special points" only if the tangent direction of at least one preceding sample point has changed more than a second predefined angle from the preceding special point from the previous special point. Each special point has four features: "X" location, "Y" location, "compass direction" and "Attribute". The compass direction may take any one of six possible values, namely: left (L) or right (R) if it is within a predefined angle from the horizontal axis; up (U) or down (D) if it is within a predefined angle from the vertical; "Null" if the stroke is smaller than a fixed size; or "End", if it is the last point of the stroke. The first predefined angle is no more than 15° from the respective axis; preferably, it is 11° in the preferred embodiment described below. The second predefined angle is 45°.

Each special point may be assigned any one of the following three "attributes":

(a) "breaking" (B) attribute, representing a sharp curvature: This attribute is applied to a special point which is injected between two consecutive PTDs which have opposite directions and the tangent direction was undefined (i.e., a 180° change in the tangent direction). This may occur where there is a sharp curve in the trajectory, such as in the case of a "sharp" breaking point. In such case, a special point assigned the attribute "breaking" is injected into the sequence between the adjacent special points of opposite directions where the tangent direction is undefined, and the "breaking" special point is applied with a tangent direction changed by 90° from the tangent direction of the first adjacent point in the direction of the tangent of the second adjacent point.

(b) A "diagonal" (D) attribute, such as may occur at "end points" and "torsion points", where the tangent to the curve is not within a second predefined angle from the X-axis or the Y-axis. The direction of a "diagonal" special point is rounded to the nearest right, left, up or down direction as described earlier, but the point is qualified with the attribute of a "diagonal" (D).

(c) "None", where the special point is assigned neither of the above attributes.

Rules of Sequencing the Special Points

The special points are arranged into time-ordered sequences, according to the following rules:

1. There should be no two consecutive points of the same compass direction (such a situation is avoided by the requirement that a sample point is considered a special point only if its tangent has changed by more than 45° from the previous special point), 2. There should be no two consecutive points of opposite compass directions (i.e., in opposite directions). Such a situation is avoided by the injection of a "breaking special point" as described above.

Rules for Matching Sequences

The sequence of special points of each inputted handwritten stroke is matched with the sequences of special points of all the reference characters which were not eliminated in the coarse screening stage described earlier according to the following rules:

A. if the corresponding compass direction in the sequence match, the two sequences are incremented;

B. if the corresponding compass direction in the two sequences are opposite to each other, and if both special points are labelled "breaking" special points, the two sequences are incremented;

C. if the two corresponding compass directions are opposite to one another, and one has an attribute identified as "B" (i.e., a "breaking" value) while the other has an attribute identified as "none", the two sequences are incremented;

D. if one of the corresponding points has an attribute identified as "diagonal", and the other does not, then:

(i) if the two points are the first ones in their respective sequences and the compass directions of the two special points are not opposite to one another, only the sequence containing the "diagonal" attribute is incremented;

(ii) if the two points are not the first ones in the sequence, none of them is the last point of its sequence, and the compass directions of the two special points are opposite to one another, the sequence with the "diagonal" attribute is incremented by "2";

(iii) if one point is diagonal, and the other is the last of its sequence, then the sequence containing the diagonal attribute is incremented.

The matching of the corresponding special points in the two sequences is continued for the complete sequences, and a "successful" match is determined to be present if the two sequences are thus completed. On the other hand, the matching of the two sequences is terminated whenever a match is not made between special points in the two sequences, and the match is determined to be an "unsuccessful" match.

The fine screening stage thus eliminates a large number of possible candidates for the handwritten character to be identified. If more than one candidate remains, the recognition mode then proceeds to the decision stage.

The Flow Chart of FIGS. 3a, 3b

The above-described operations are illustrated in the flow chart of FIGS. 3a and 3b.

The first operation is to collect the special points out of the pen trajectory sample points and to record their coordinates, compass directions, and attributes (block 30). As described above, there are four types of special points, namely: (a) end points, (b) points in which the tangent to the trajectory is close to parallel to the horizontal axis or vertical axis, (c) "torsion" points, and (d) "breaking point". All the foregoing points are identified by their compass directions, and attributes if any.

The special points are then connected into a time-ordered sequence for each pen stroke of the input signal (block 31). Such sequences are shown, for example, in the characters of FIGS. 4b–9b, and their respective tables shown in FIGS. 4a–9a.

A check is then made (block 32) whether there are consecutive points of opposite directions; if so, a "breaking" point is injected into the sequence (block 33) as described above.

A check is then made whether the tangent is not parallel to the X-axis or Y-axis (block 34). As described earlier, this may occur at an end point or a torsion point, in which case the direction of the tangent is rounded to the nearest R,L, U,D direction and is qualified with the "diagonal" attribute (block 35).

After all the special points have thus been collected for each stroke of the inputted handwritten character, all the coordinates of the points are normalized to the smallest rectangle which encompasses the trace of the stroke (block 36).

The inputted data for the respective character is then compared with the reference characters stored in the library (block 37), i.e., in the library of stored reference characters.

First, a coarse screening operation is performed in which the number of strokes of the input symbol is compared to the number of strokes in the respective reference character (block 38); if there is no match, the respective reference character is eliminated from the candidate list (block 39). After all the reference characters have thus been scanned (blocks 40, 41), a decision is made whether a match has occurred with respect to any of the reference characters (block 42); if not, the inputted handwritten character is identified as an unrecognized character (block 43). In such a case, the character can either be ignored, or can be added to the library by selecting the Learning mode, and entering its correct identification to store its fetures in the library models.

When scanning each of the reference characters during the fine screening stage, a check is made as to whether the sequence of special points in the inputted handwritten character matches the sequence of points in the reference character of the library model (block 45); if not, the reference character is eliminated from the candidate list (block 46).

A check is then made whether all the reference characters in the library models have been checked (blocks 47, 48); if so, a check is made to determine whether any candidates have been selected (block 49). If not, the character is determined to be an unrecognized character (block 50), which may be ignored or added to the library in a Learning mode, as described above with respect to block 43.

This completes the fine screening stage. If more than one reference character passes this stage, the system then proceeds to the decision stage to determine which of the characters passing the fine screening stage has the best match with the inputted handwritten character.

In the decision stage, the norm distance (i.e., the sum of the square distances) is calculated between corresponding points of the handwritten character to be recognized and each of the reference characters passing the fine screening stage (block 51); the reference character having the smallest norm distance so calculated is chosen (block 52); and the code of the so-selected reference character is outputted as the identification of the inputted handwritten character (block 53).

Examples of Character Recognition

The recognition process will now be described with respect to several examples as illustrated in FIGS. 4–9.

FIGS. 4–7 illustrate several examples of reference characters as stored in the library and as having the characteristics set forth in the Tables of FIGS. 4a–7a respectively, as also stored in the library. FIG. 8 illustrates an example of a one-stroke handwritten character inputted into the system via the digitizing tablet 2 (FIG. 1), having the characteristics of the Table of FIGS. 8a, which characteristics are to be compared with those of the reference characters of FIGS. 4–7; and FIG. 9 illustrates a two-stroke handwritten character inputted via the digitizing tablet 2 and having the characteristics set forth in the Table of FIGS. 9a, which characteristics are also to be compared with the reference characters stored in the look-up table.

With reference first to the inputted handwritten character illustrated in FIG. 8, it will be seen that since this character is a one-stroke character, the coarse screening stage will immediately eliminate the character "t" of FIG. 6, which is a two-stroke character. This leaves only the one-stroke characters of FIGS. 4, 5 and 7 to be compared in the fine screening stage.

Figures 4A, 4B:
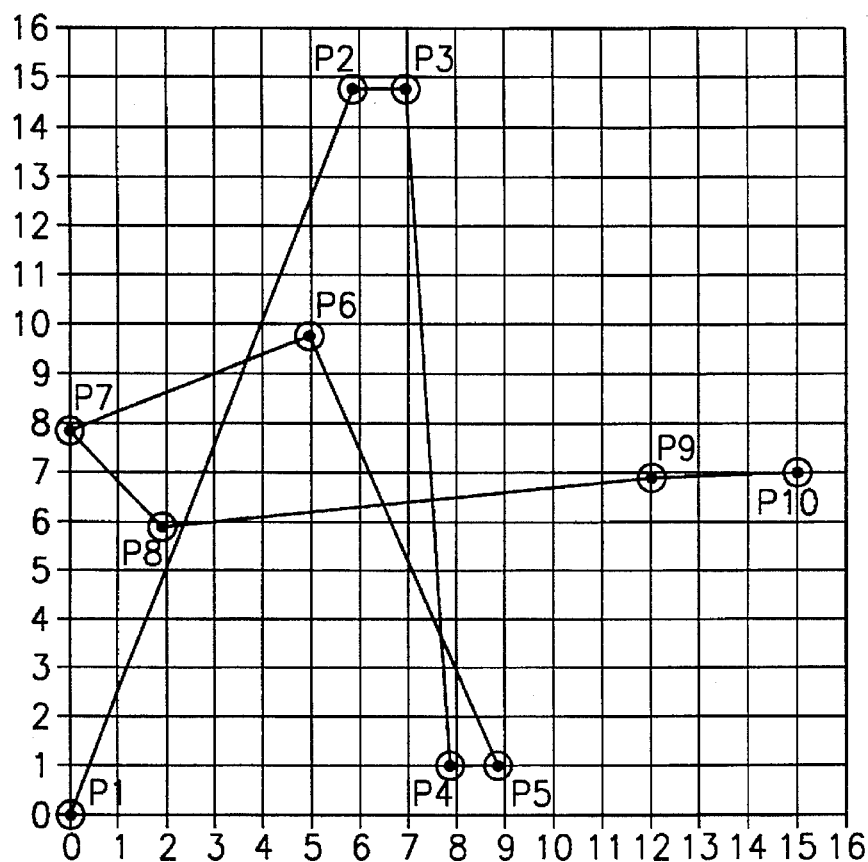
FIGS. 4–9, together with their respective tables 4a–9a illustrate a number of handwritten characters helpful in understanding the character recognition method illustrated by the flow chart of FIGS. 3a and 3b.
Figures 5A, 5B:
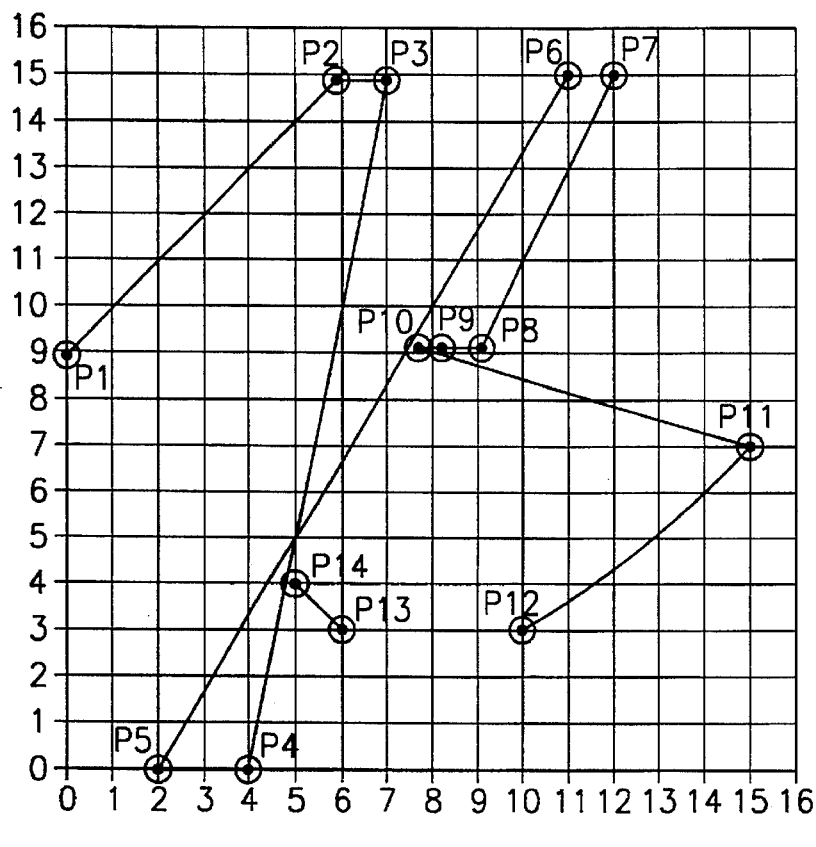
Figures 7A, 7B:
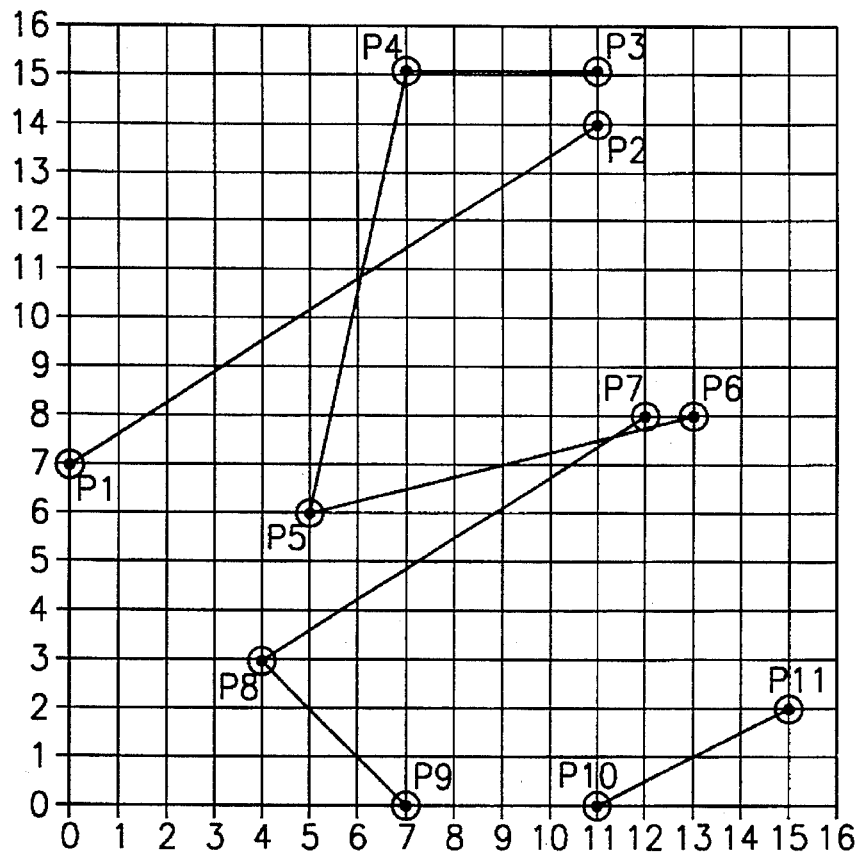
Figures 8A, 8B:
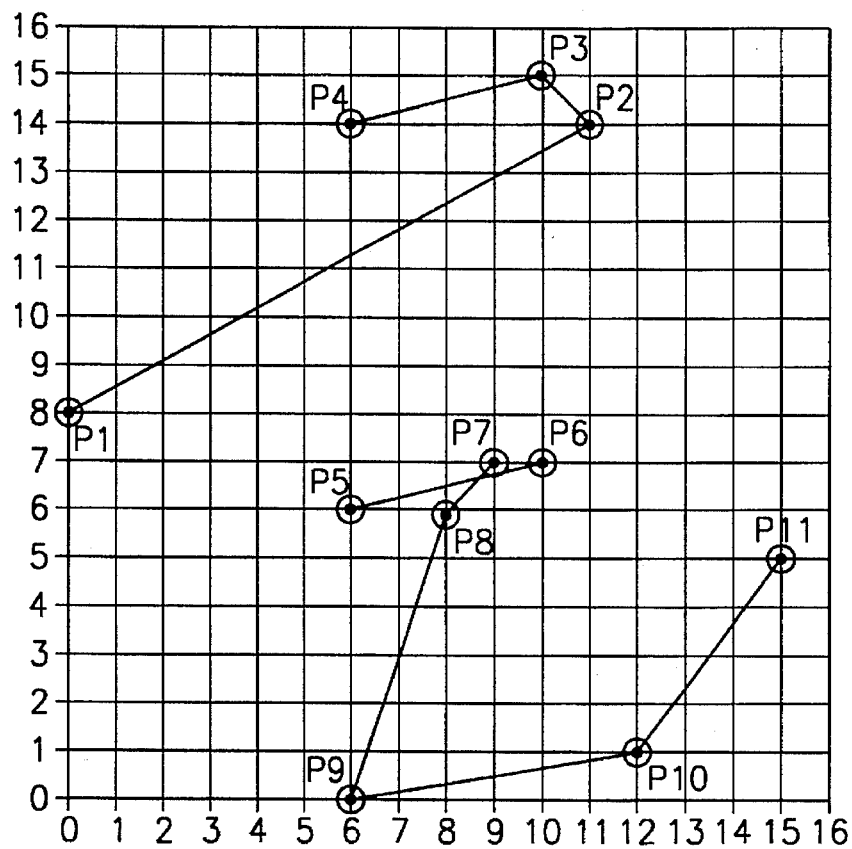
Figures 9A, 9B:
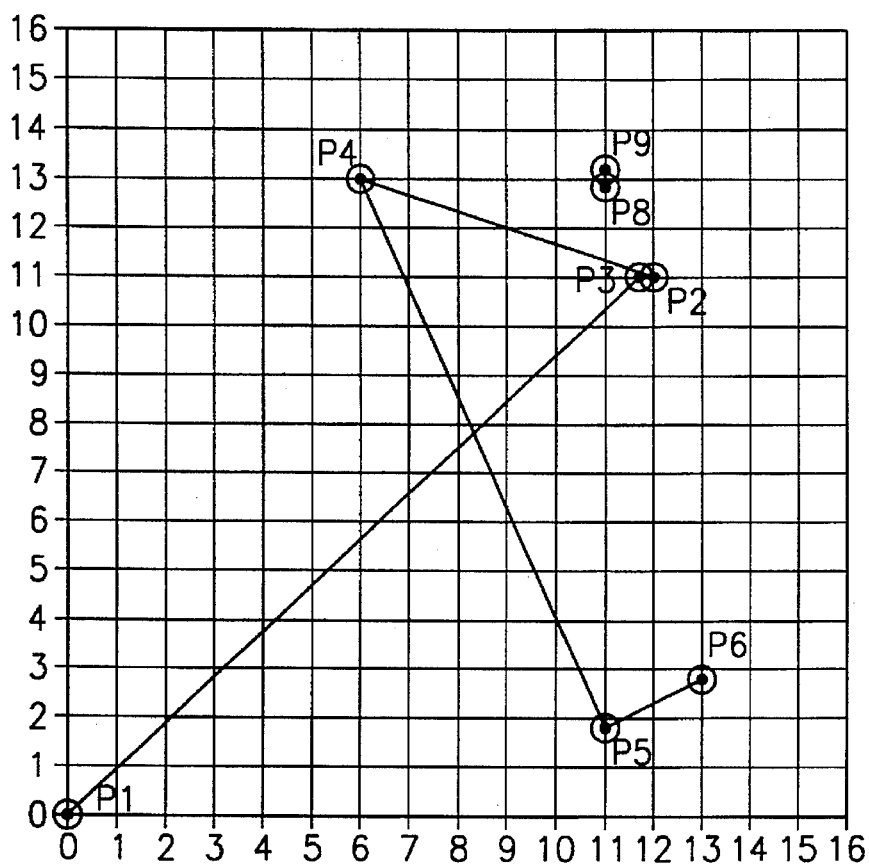

As described above, in the fine-screening stage each sequence of special points of the inputted handwritten character of FIG. 8, as set forth in FIG. 8a, is compared with the sequence of special points in each of the reference characters of FIGS. 4, 5 and 7 as set forth in FIGS. 4a, 5a and 7a, respectively, in accordance with the above Rules of Matching Sequences.

Comparing the special points of FIG. 8a (the inputted reference character of FIG. 8) with FIG. 4a (the stored reference character of FIG. 4), it will be seen that point $P_1$ in FIG. 8a is "R", and in FIG. 4a it is "U". However, this point in FIG. 8a is qualified with the attribute "D" (diagonal), while that of FIG. 4a is "null" (blank); moreover, the compass directions are the first ones in the sequence and are not opposite to one another. According to Matching Sequence Rule D(i), only the sequence containing the "diagonal" attribute (Point $P_1$ of FIG. 8a), is incremented.

We now proceed to compare point $P_2$ of Table 8a with point $P_1$ of FIG. 4a. The two compass directions are equal (U), and therefore we continue to compare point $P_3$ of FIG. 8a with point $P_2$ of FIG. 4a. These two points are opposite to one another (being "L" in FIG. 8a and "R" in FIG. 4a). However, point $P_2$ in FIG. 4a is qualified with the attribute "B" (break), while point $P_3$ in FIG. 8a has no attribute. According to Matching Sequence Rule C, both sequences are incremented.

From hereon, all the respective special points $P_3$–$P_9$ in FIG. 4a match with points $P_4$–$P_{10}$ in FIG. 8a, in that they all have the same compass directions; therefore, the reference character of FIG. 4 passes the fine screening stage.

The sequence of points as set forth in FIG. 8a, corresponding to the inputted handwritten character of FIG. 8, are then compared to those of FIGS. 5a corresponding to the reference character illustrated in FIG. 5. In this comparison, it will be seen that point $P_1$ of FIG. 8a and point $P_1$ of FIG. 5a have different compass directions; in addition, the attributes of both are "D" (diagonal), and therefore there is no match according to the Matching Sequence Rules. Accordingly, the reference character of FIG. 5 is eliminated in this fine screening stage.

The special points as set forth in FIG. 8a, corresponding to the inputted handwritten character of FIG. 8, are then compared to those appearing in FIG. 7a, corresponding to reference character of FIG. 7. FIG. 8a has the same number of special points with exactly the same compass directions as FIG. 7a, and therefore the reference character of FIG. 7 passes the fine screening stage.

This matching procedure of course continues with all the other reference characters stored in the library.

Assuming that only the characters of FIGS. 4 and 7 have passed the fine screening stage, the process now proceeds to the decision stage to determine which of these two characters makes a best match with the inputted handwritten character of FIG. 8.

As indicated earlier, before the decision stage is reached, the coordinates of all the special points of the handwritten character to be recognized have been normalized to the smallest rectangle which encompasses all the special points (block 36, FIG. 3a). In the decision stage, the sum of the square distances between corresponding points of the handwritten character to be recognized, and each of the non-eliminated reference characters, are calculated; and the reference character having the smallest sum so calculated is identified as the handwritten character.

Thus, in this decision stage, the square euclidean distances are summed between the matched points of the character in FIG. 4 (FIG. 4a); in this example, this sum for the character of FIG. 4 is 333. Similarly, the square euclidean distances between the matched reference character of FIG. 7 (FIG. 7a) are summed; in this example, the sum is 62. Since the sum for FIG. 7 is much smaller than that for FIG. 4, the reference character of FIG. 7 is determined to be the one having the best match with the inputted handwritten character of FIG. 8 (FIG. 8a).

FIG. 9 illustrates a two-stroke handwritten character inputted via the digitizing tablet 2, and FIG. 9a represents the features extracted during the analyis of such a two-stroke character.

It wil be seen that the coarse screening operation described above will eliminate all the stored reference characters as illustrated in FIGS. 4, 5 and 7, all relating to a single-stroke character, and will therefore pass as a possible candidate only the two-stroke character illustrated in FIG. 6.

Figures 6A, 6B:
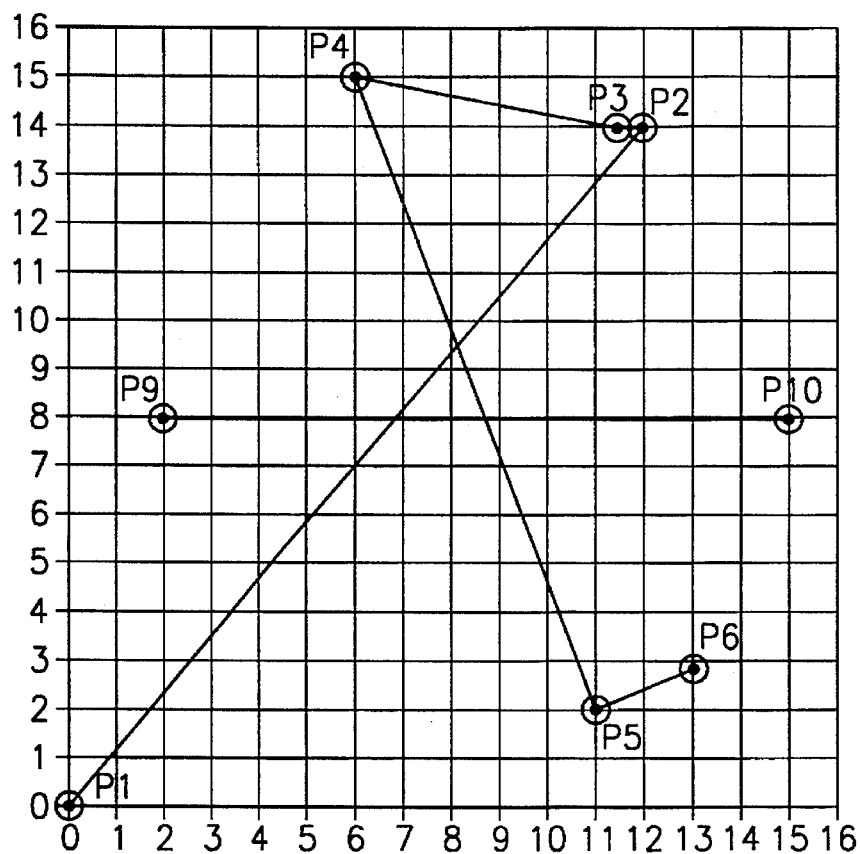

It will also be seen that all the extracted features (compass directions and attributes) of the first stroke of the two-stroke reference character in FIG. 6 ("t"), as shown in FIG. 6a, also match those of the first stroke of the inputted handwritten character as illustrated in FIG. 9 and in its FIG. 9a. However, the compass directions of the second stroke (points $P_9$, $P_{10}$) of the reference character in FIG. 6, as shown in FIG. 6a, do not match the extracted features of the second stroke in the inputted handwritten character of FIG. 9, as illustrated by points $P_8$, $P_9$ in FIG. 9a. Accordingly, the reference character ("t") illustrated in FIG. 6 will not pass the fine-screening stage, and will therefore not be a possible candidate for the decision stage.

The stored reference characters would presumably include a character having the extracted features corresponding to those of FIG. 9 and FIG. 9a so as to pass the fine screening stage. However, if there is no such character, the result will be an unrecognized character. This will be indicated by the system, and in such case the user may shift to the Learning mode in order to input and store a reference character having these features so that such a reference character will thereafter be recognized as a possible candidate whenever inputting, for recognition, a handwritten character corresponding to that illustrated in FIG. 9, FIG. 9a.

Figure 10A:
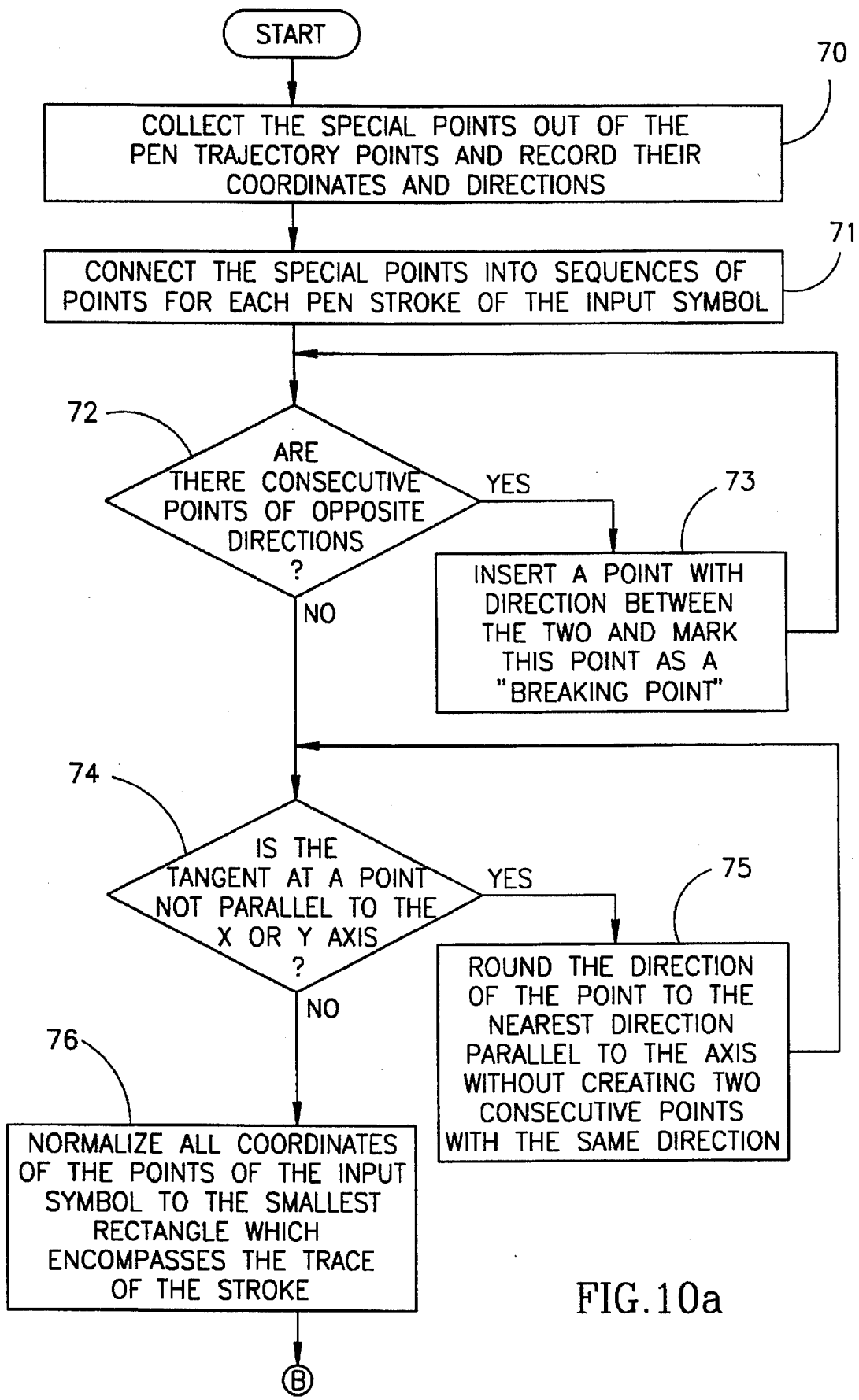
FIGS. 10a and 10b, taken together, constitute a flow chart illustrating the Learning mode stage in the described character recognition method.
Figure 10B:
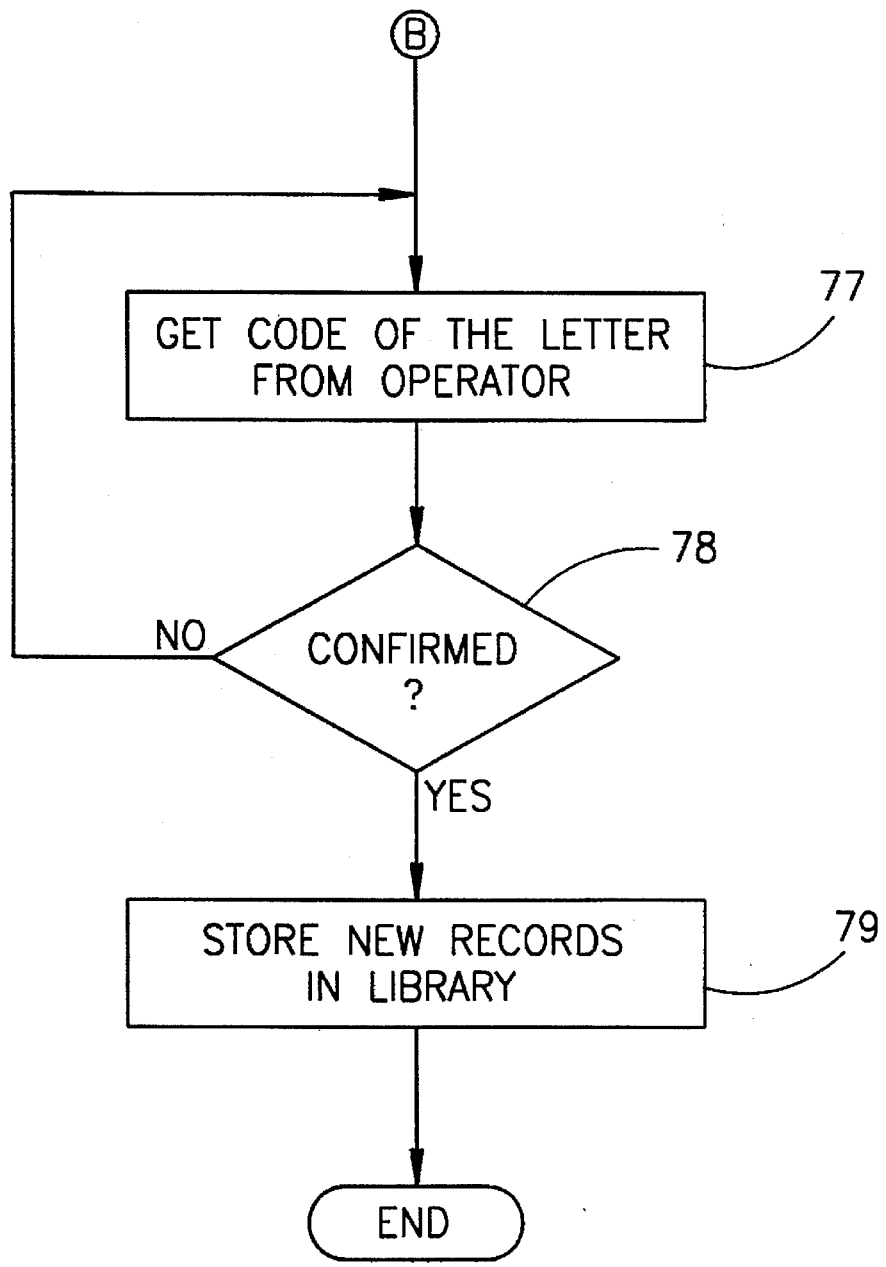

The Learning Mode (FIGS. 10a, 10b)

As indicated earlier, the Learning mode, as illustrated in FIGS. 10a, 10b, is used in order to store, in the library of the reference character models, the features of all the reference characters with which each inputted handwritten character is to be compared in order to determine the best match. As also indicated above, the Recognition mode may be interrupted and switched to the Learning mode, in order to correct an error in the identification of a character, or to enable the system to identify a character which it previously was unable to identify.

Thus, in the Learning mode, the special points of the pen trajectory are collected and their coordinates and directions are recorded in the library, as described above (block 70, FIG. 10a). The special points are then connected into sequences of points for each pen stroke of the input signal (block 71). A decision is then made whether any pair of consecutive points are of opposite directions (block 72); and if yes, a "breaking point" is inserted (block 73) in the same manner as described above in the Recognition mode. If there are no consecutive points of opposite directions, a decision is made whether the tangent at a point is not parallel to the X-axis or Y-axis (block 74); if "yes", the point is labelled with the "D" (Diagonal) attribute and its direction is rounded to the nearest direction parallel to the axis, without creating two consecutive points with the same direction, as described above, in order to have compass directions of only four possible directions (U,D,L,R, block 75).

All the coordinates are then normalized to the smallest rectangle which encompasses all the special points (block 76).

The operator then inputs a code identifying the respective character (block 77), and after a confirmation step (block 78), the new record is stored in the look-up table (block 79).

While the invention has been described with respect to one preferred embodiment, it will be appreciated that this is set forth merely for purposes of example, and that many other variations, modifications and applications of the invention may be made.

What is claimed is:

1. A method of recognizing a character comprising the operations: (a) measuring the angle of the tangent to the character at each of a plurality of sample points on the character; (b) assigning those points having a tangent direction within a first, small predefined angle from the vertical axis with values of Up (u) or Down (D) compass directions, and those points having a tangent direction within the first, small predefined angle from the horizontal axis with values of Left (L) or Right (R) compass directions;

(c) selecting as special points at least those sample points i) at the beginning and end of said character;

ii) whose compass direction is different than that of the previously selected special point;

iii) whose compass direction is the same as the previous special point only if:

a) there is at least one sample point, among the sample points between the two sample points with the same compass direction, which has no compass direction, and b) at least one of said sample points with no compass direction is a "torsion" point defined as a point having a tangent direction which is a significant local extremum among those sample points with no compass direction between the two sample points having the same compass direction;

iv) which are torsion points;

(d) arranging said special points according to predefined rules;

(e) and utilizing the resulting arrangement of special points for recognizing the character.

2. The method according to claim 1, wherein said first predefined angle is not more than 15° from the respective axis.

3. The method according to claim 2, wherein said first predefined angle is about 11° from the respective axis.

4. The method according to claim 1, wherein the tangent angle at each of said plurality of sample points is defined by the angle between an imaginary chord, connecting a preceding sample point with a succeeding sample point both spaced a predefined number of sample points away on either side of the respective sample point, and the vertical axis of the handwriting device.

5. The method according to claim 4, wherein the length of said chord is also measured, and if below a predetermined minimum length, the sample point is assigned an identification indicating an ambiguous tangent direction.

6. The method according to claim 1, wherein the method is used for the real-time recognition of handwritten characters as they are written as a series of handwritten strokes, and wherein the arrangement of special points resulting from predefined sequence in operation (d) is a time-ordered sequence.

7. The method according to claim 6, further including determine the location of the start and end points of each handwritten stroke, and utilizing also the location of said start and end points as start special points and end special points for recognizing the character according to the operations (d) and (e).

8. The method according to claim 6, wherein said time-ordered sequence of special points is utilized for recognizing the character by matching it with stored sequences of special points of a plurality of stored reference characters.

9. The method according to claim 8, wherein said operation (d) includes examining said time-ordered sequence of changes in the compass directions of the handwritten character for the presence of a 180° change between first and second adjacent special points in the sequence; and upon detecting the presence of such a 180° change, injecting a further special point, identified with the attribute "breaking", into said sequence between said adjacent special points, and applying to said further special point a compass direction changed by 90° from the compass direction of the first adjacent point, towards the compass direction of the second adjacent point.

10. The method according to claim 9, wherein: all special points not within the first predefined angle from the horizontal and vertical axes are rounded to the nearest axes but are identified with the attribute of "diagonal" (D); and the sequence of the special points of the handwritten character to be identified, and the sequences of the special points in the library, are matched according to the following rules:

(a) if the corresponding compass directions in the sequence match, the two sequences are incremented;

(b) if the corresponding compass directions in the two sequences are opposite to each other, and if both special points are identified with the attribute "breaking", the two sequences are incremented;

(c) if the two corresponding compass directions are opposite to one another, and one is identified with the attribute "breaking", while the other is identified with no attribute, the two sequences are incremented;

(d) if one of the corresponding points is identified with the attribute "diagonal", and the other is not, then:
  (i) if the two points are the first ones in their respective sequences, none of them is the last point of its sequence, and the tangent directions of the two special points are not opposite to one another, only the sequence containing the "diagonal" attribute is incremented;
  (ii) if the two points are not the first ones in the sequence, none of them is the last point of its sequence and the tangent directions of the two special points are opposite to one another, the sequence with the "diagonal" attribute is incremented by "2";
  (iii) if one point is diagonal, and the other is the last of its sequence, then the sequence containing the diagonal attribute is incremented;

(e) continue matching the corresponding special points in the two sequences for the complete sequences, and determine a "successful" match to the present if the two sequences are thus completed; and (f) terminate the matching of the two sequences whenever a match as above is not made between the two sequences, and determine the match to be an "unsuccessful" match.

11. The method according to claim 6, wherein said time-ordered sequences of special points are stored in a library which also includes the number of strokes of each of a plurality of stored reference characters; said method further including a preliminary screening operation of:

(i) comparing the number of strokes of the handwritten character to be recognized with the number of strokes of the stored reference characters in the library, and (ii) eliminating from further matching those reference characters not having the same number of strokes as in the handwritten character to be recognized.

12. The method according to claim 11, further including normalizing the coordinates of all special points of the handwritten character to be recognized to the smallest rectangle which encompasses all said special points.

13. The method according to claim 12, wherein, if more than one reference character of the library matches the sequence of special points of the handwritten character to be recognized, a decision operation is performed to determine the reference character having the best match with the handwritten character to be recognized, by:

(i) calculating the sum of the square distances between corresponding points of the handwritten character to be recognized and each of said matched reference characters; and (ii) identifying the handwritten character as the reference character having the smallest sum so calculated.

* * * * *